March 26, 1940.   H. B. TRACY   2,194,878
FRESH AIR INLET VALVE
Filed June 8, 1939   2 Sheets-Sheet 1

INVENTOR
HAROLD B. TRACY
BY A. S. Krotz
ATTORNEY

March 26, 1940.   H. B. TRACY   2,194,878
FRESH AIR INLET VALVE
Filed June 8, 1939   2 Sheets-Sheet 2

INVENTOR
HAROLD B. TRACY
BY A.S.Krob
ATTORNEY

Patented Mar. 26, 1940

2,194,878

UNITED STATES PATENT OFFICE 2,194,878

FRESH AIR INLET VALVE

Harold B. Tracy, Fort Atkinson, Wis., assignor to James Manufacturing Company, Fort Atkinson, Wis., a corporation of Wisconsin Application June 8, 1939, Serial No. 278,029

5 Claims. (Cl. 98—37)

The present invention relates to ventilating valves which operate automatically to regulate and control the inflow of air and to prevent reverse drafts.

The principal object of the present invention is to provide a simple efficient device which will operate noiselessly and successfully for an indefinite period without attention.

An object of my invention is to provide a damper which is accurate in its operation, very sensitive to normal inflow and reverse flow of air but having means whereby abnormal conditions are adapted to bring into play means associated with the pivot which will shift the center of gravity when the damper is moved rearwardly past a vertical center to thereby add resistance to this movement.

A novel feature of my invention is that the damper cannot contact metal in its various positions and is supported preferably on a composition rubber block, the pivotal means on the damper being provided with knife edges thus to make the damper very sensitive in its operation and prevent friction.

Another object of the present invention is to provide a unitary device which may be easily set into the wall of the building and made water tight.

To these and other useful ends, my invention consists of parts, combinations of parts, or their equivalents, and mode of operation, as hereinafter set forth and claimed and shown in the accompanying drawings in which:

Figure 1:
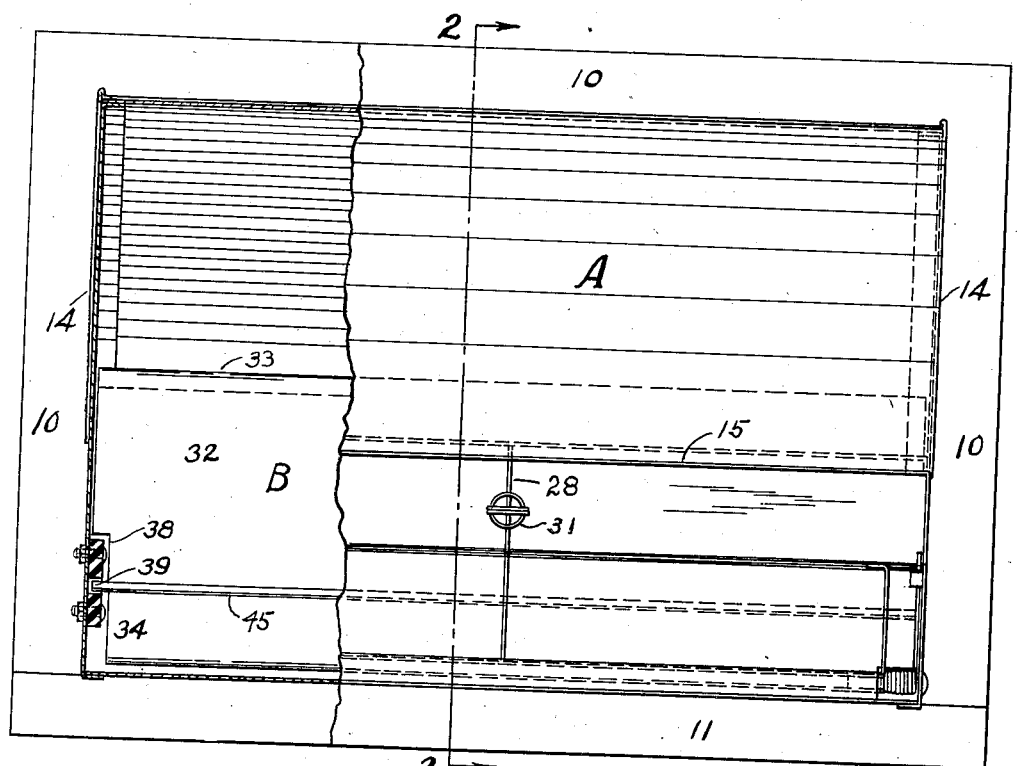
Fig. 1 is a rear view of the device having a fraction cut-away so as to disclose the device on line 1—1 of Figure 2.

As thus illustrated in Figures 1 to 7 the housing in its entirety is designated by reference character A having a regulating damper which in its entirety is designated by reference character B.

Member A is preferably designed to be set in an opening in the outside wall of the building served and is, at its top and ends provided with a flange 10 which is adapted to rest against the rear or inside face of the wall and a flange 11 which is adapted to rest against the front or outside of the wall thus to form water proof connections to the wall at the top, ends and bottom of the housing.

Member A is preferably provided with a curved hood 12 having a bottom plate 13 and end walls 14—14. The rear portion of the hood terminates as at 15 thus to provide an air outlet as at 16. The front and end members of the hood terminate on line 17 forming an inlet opening for the air.

Member 13 is bent as at 18, the free end 19 being extended rearwardly and upwardly thus forming an air guideway for the bottom of the inlet.

I provide preferably a storm hood 20 having end members 21 which are secured to the housing as illustrated and on line 17. Hood 20 is provided with a bird screen 22. Thus it will be seen that I have provided an inlet as at 22 which is protected because of its position against the entrance therein of water. The hood 12 provides a circular pathway between inlet 22 and outlet 16 as indicated by curvilinear arrows.

It is frequently necessary to entirely close devices of the class. For this purpose I provide a damper 25, the free end of which is bent as at 26 and having a narrow flange 27 and a spring anchor 28.

Damper 25 is illustrated in its closed position and is hingedly connected to housing members 14 as at 29. It will be seen that when the damper is in its open position as indicated by dotted lines, the free end of the damper will act as an air guide similar to member 19. This damper may be adjusted by means of a chain 30 having a spring 31, the chain being extended through a key-way opening (not shown) whereby the damper may be held in any desired position or closed tightly and locked in its closed position because of spring 31.

My improved damper and pivotal support for the damper is designed as follows: The damper plate is designated by numeral 32, the free end being folded as at 33 to thereby stiffen the edge. The other side of the damper is preferably embraced by means of a strip 34 which is folded so as to inclose the edge of the damper as clearly illustrated in the various figures and having a reverse fold as at 35.

Figure 6:
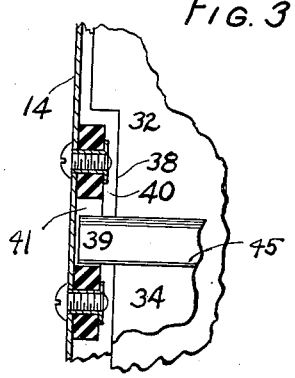
Fig. 6 is an enlarged sectional view taken on line 6—6 of Figure 4.

The upper end of member 34 is bent at an angle of about 45° as at 36 and then being bent at right angle as at 37. By scrutinizing Figure 6 it will be seen that a portion of member 34 is cut-away thus forming an angle extension 39 which is adapted to act as hinge supports for the damper in the following manner:

Preferably a composition rubber block 40 is secured to the end plates 14 of the housing as clearly illustrated in Figures 1 and 6. This composition block is provided with an opening 41, the bottom edge being formed into a reverse V-shaped projection 42. Member 39 extends into openings 41 as illustrated in the various figures the bottom edge 43 resting in the V-shaped opening at the front of member 42 when the damper is in the position illustrated in Figures 3 and 7. Thus point 43 provides a knife edge support for the damper when it is closed as illustrated fractionally in Figure 2 by dotted lines C and in Figures 3 and 7 at which time L-shaped member 39 rests against the front and top edges of opening 41 as at 44 and 45 thus providing an effective stop for the damper when in its closed position or the position caused by a reverse draft as will hereinafter appear.

Figure 2:
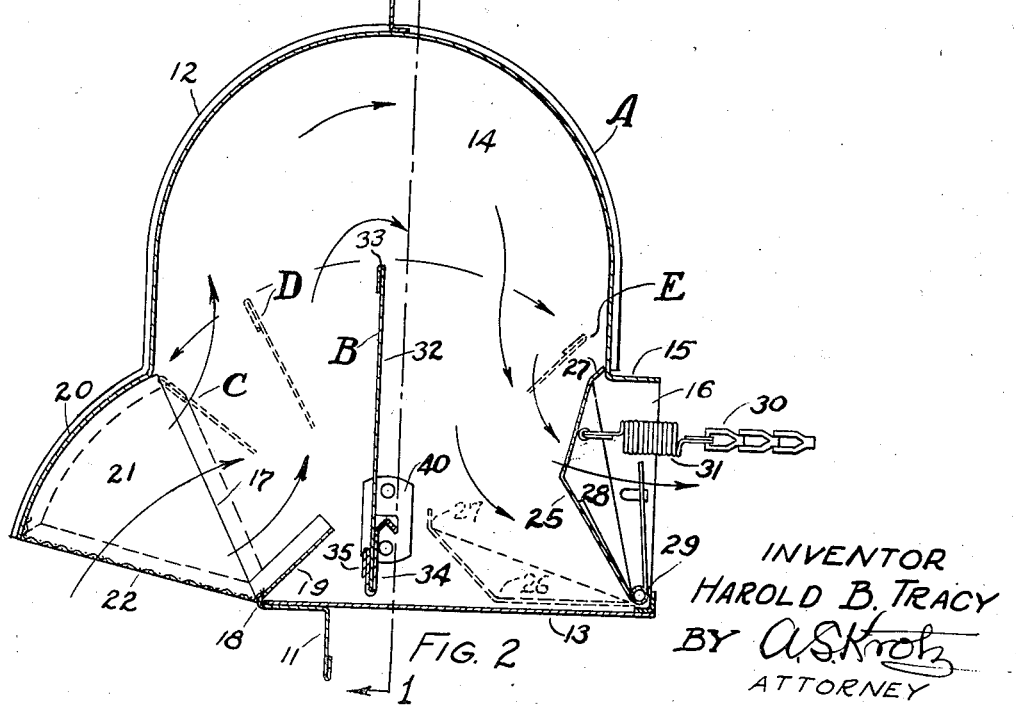
Fig. 2 is a transverse section taken on line 2—2 of Figure 1.

The normal position at which damper 32 rests by gravity is designated by dotted lines as at D in Figure 2. Thus it will be seen that the damper, when in this position, will be supported on knife edges 43 and therefore it will require very little action of the air to move it in either direction. For example, if damper 25 is open, a very slight reverse draft will move the damper to a closed position as at C and a very slight in movement of air as illustrated by curvilinear arrows will cause the damper to move to the position illustrated in Figures 1 and 4 which I term a wide open position.

It will be noted that when the damper is in this wide open position, member 39 on its under side will rest on projection 42 for the width of the projection wherein the damper is resisted from further opening by a shift of the weight to knife edge 45. Thus it will require a considerable increase in air pressure against the damper to further move the damper rearwardly and if this increase of air movement is great enough, the damper will be caused to move to the limit position shown in Figure 5 thus leaving but a small opening for the passage of air as at E (see Figure 2).

Clearly an excess movement of air into the building will be prevented. For example, in the case of a storm blowing directly against the inlet, the damper will be forced to its rear position and only a normal volume of air permitted to enter the building.

Clearly the damper will control or meter the inflow of air under all conditions. When the abnormal conditions which cause the damper to move to the position shown in Figure 5 are removed, the damper will immediately return to some intermediate position.

It will be noted that because of the shape of the storm hood 20, guard 19, the curved hood 12 and valve 25, the air will have an easy curved path through the housing and that regardless of the position of the damper, its pivots will at all times be in contact with some part of opening 41. Thus the movement of the damper will always be noiseless and practically frictionless.

Figure 3:
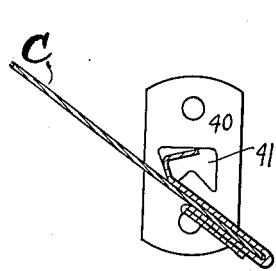
Figures 3, 4 and 5 are each fractional views of the damper illustrating it in three different positions.
Figure 4:
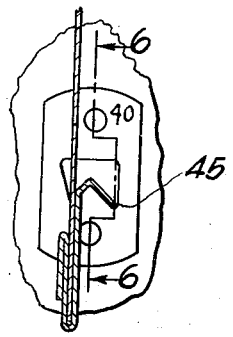
Figure 5:
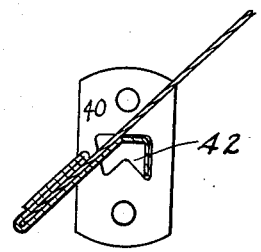
Figure 8:
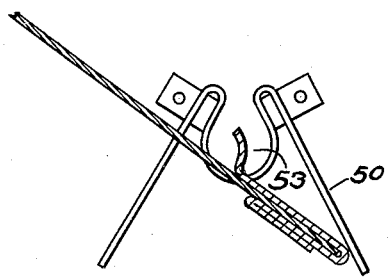
Figures 8, 9 and 10 are fractional end views of a modification showing the dampers in the position illustrated in Figures 3, 4 and 5 respectively.
Figure 9:
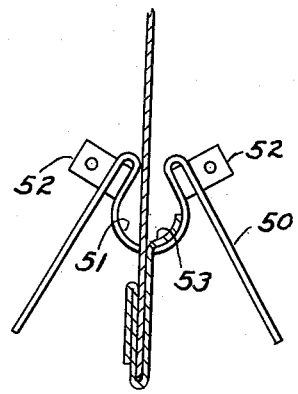
Figure 10:
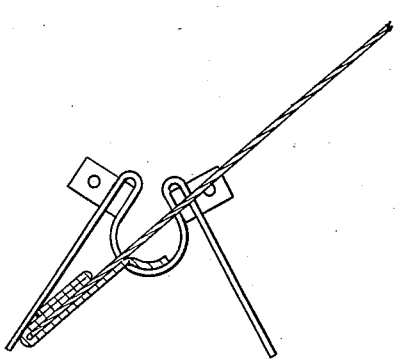
Figure 7:
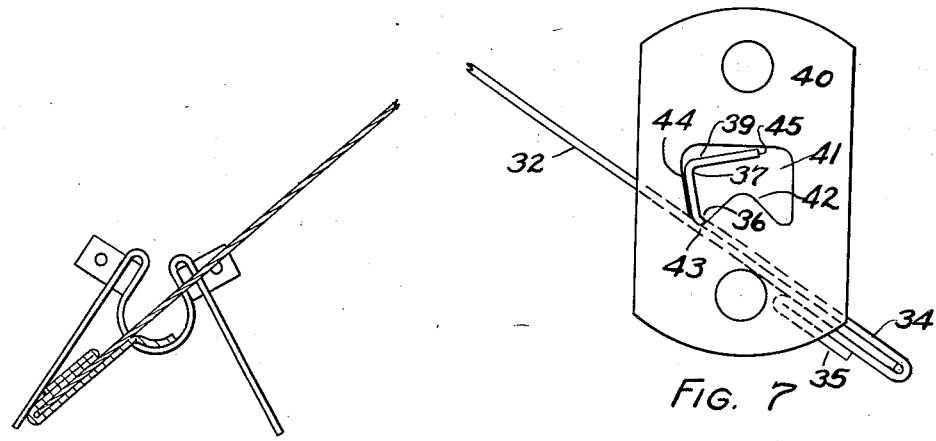
Fig. 7 is an enlarged fractional end view of the damper and the supporting block similar to Figure 3.

In Figures 8, 9 and 10 I illustrate a modification wherein positions of the damper are shown which correspond to that shown in Figures 3, 4 and 5 respectively. In this design, I provide brackets 50 which are shaped as illustrated and forming a curved inner surface 51, the brackets being secured to end members 14 by means of pads 52—52. The projecting members 53 which act as pivots for the damper are shaped as illustrated in these figures whereby when the damper is in the position illustrated in Figure 9, a further movement rearward will be resisted somewhat by friction between members 51 and 53 or by the shift of the center of gravity as shown in Figures 4 and 5. It will be noted however, that when the damper is in any forward position, it will be supported on knife edge pivots as in the other design.

It will be seen that when the damper is in its central position, additional pressure would be required to move it rearwardly exactly as in the other design and the return movement will be under practically the same influence as in the other design.

The modification differs only in that metal to metal contacts are made between the pivotal members and their supports. However, the pivotal supports do not act as stops for the damper. The depending portions of the bracket act for this purpose as illustrated in Figures 8 and 10.

Clearly many minor detail changes may be made without departing from the spirit and scope of the present invention as recited in the appended claims.

Having thus shown and described my invention, I claim:

1. A ventilator of the class described, comprising a housing having air inlet and outlet openings on opposite sides and at the bottom thereof, a damper pivotally mounted at its ends near its bottom to the side walls of said housing and near the transverse center thereof, said damper being of a width whereby when in a medial position the free side is a considerable distance from the housing to thereby provide an air passageway therearound, the free end of said damper adapted to close said inlet when in its forward position and to partially close the outlet when in its extreme rearward position, said damper pivot having transversely spaced knife edge pivots and means whereby the damper will rest on the forward knife edges by gravity in a mid-forward position and whereby when said damper is moved rearward past a vertical position, it will rest on the rear knife edges to thereby additionally resist by gravity the further rearward movement of the damper.

2. A device as recited in claim 1 including; said inlet having a storm hood which extends downwardly and forwardly over the inlet to thereby prevent ingress of water.

3. A ventilator of the class described, comprising a housing having therein a self regulating damper, said damper being pivoted at its ends to the end members of the housing, said pivots comprising slightly resilient blocks secured to the end members of the housing having openings into which the other members of the pivots extend, said other members having two spaced knife edges one adapted to cause the damper to rest in the forward side of said opening by gravity at a partially open position, the other pivots being spaced rearwardly from the first pivots and adapted to support the damper when in a rearward position to thereby shift the center of gravity, said pivots having means adapted to act to stop the damper when moved to a closed position by a back-draft and to stop the damper when moved by an abnormal inrush of air at a slightly open position rearwardly, said housing being shaped to thereby provide maximum air passage over the damper when the damper is in a medial position.

4. A natural inlet draft ventilator of the class described, comprising a housing having an inlet and outlet opening on opposite sides and near the bottom thereof, a damper pivotally mounted on the end members of said housing and adapted to provide a full air draft open space when in a vertical or medial position and to close the inlet when in a forward position and having a stop whereby an abnormal inflow of air will cause the damper to rest in a nearly closed position rearwardly, said pivots comprising transversely spaced knife edges the forward edges adapted to hold the valve by gravity in a medial forward position, the rearward knife edges adapted to support said damper when the damper is in a vertical or rearward position to thereby shift the center of gravity and act on the damper to resist its further movement past the center, means on said pivot members adapted to contact said block when the damper is closed in its forward position and stop the damper when in its extreme rearward position.

5. A ventilator of the class described, comprising a housing having air inlet and outlet openings on opposite sides thereof having a self-acting damper pivotally mounted therebetween, said pivotal mounting comprising brackets each having an opening therein for the reception of the damper pivots, said damper pivots each comprising two transversely spaced knife edges the forward edges acting as supports for the damper and positioned to thereby hold the damper by gravity in a partially closed forward position, the other two knife edges adapted to act as supports for the damper when the damper is moved rearwardly past a vertical position to thereby shift the center of gravity and add resistance to the rearward passage of the damper, said housing having a shape thereby to provide a maximum air passageway when the damper is in its central position, a manually operated damper positioned in said outlet.

HAROLD B. TRACY.